(12) United States Patent
Liu et al.

(10) Patent No.: US 10,915,732 B2
(45) Date of Patent: Feb. 9, 2021

(54) IMAGE PROCESSING METHOD CAPABLE OF PROCESSING FACIAL DATA AND NON-FACIAL DATA DIFFERENTIALLY

(71) Applicant: REALTEK SEMICONDUCTOR CORPORATION, Hsinchu (TW)

(72) Inventors: Kai Liu, Taipei (TW); Zhong-Yi Qiu, Taichung (TW); Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 86 days.

(21) Appl. No.: 16/404,802

(22) Filed: May 7, 2019

(65) Prior Publication Data
US 2019/0347470 A1    Nov. 14, 2019

(30) Foreign Application Priority Data

May 8, 2018  (TW) .............................. 107115573 A (51) Int. Cl.
*G06T 5/00*    (2006.01)
*G06K 9/00*    (2006.01)
(Continued)

(52) U.S. Cl.
CPC .......... *G06K 9/00234* (2013.01); *G06K 9/40* (2013.01); *G06T 5/002* (2013.01); *G06T 7/11* (2017.01); *G06T 2207/30201* (2013.01)

(58) Field of Classification Search
CPC .......... G06K 9/00234; G06K 9/00248; G06K 9/342; G06K 9/4652; G06T 2207/10024; G06T 2207/30201; G06T 5/002; G06T 5/008; G06T 7/11; G06T 7/194; G06T 5/005; G06T 11/00; G06T 2200/24; G06T 5/00; G06T 7/60; G06T 7/73;
(Continued)

(56) References Cited

U.S. PATENT DOCUMENTS

| 8,224,108 B2 | 7/2012 | Steinberg et al. |
| 8,681,880 B2 * | 3/2014 | Eddy .................. G06T 5/002 |
| | | 375/240.29 |

(Continued)

FOREIGN PATENT DOCUMENTS

| CN | 103699888 A | 4/2014 |
| CN | 105359162 A | 2/2016 |
| TW | 200639743 A | 11/2006 |

OTHER PUBLICATIONS

OA letter of the counterpart TW application (appl. No. 107115573) mailed on Jul. 12, 2019. Summary of the OA letter: claims 1-10 are rejected as being unpatentable over the cited references 1&2 (TW 200639743 A & CN 105359162 A).

*Primary Examiner* — Quan M Hua
(74) *Attorney, Agent, or Firm* — WPAT, PC (57) ABSTRACT

Disclosed is an image processing method capable of processing facial data and non-facial data differentially. The method is carried out by an image processing device, and includes the following steps: determining a facial region, a non-facial region and a transitional region according to a face detection result of an image, in which the transitional region is between the facial region and the non-facial region; and executing different processes for the data of the facial region, the data of the non-facial region and the data of the transitional region respectively.

18 Claims, 5 Drawing Sheets

S110 — determining a facial region, a non-facial region and a transitional region according to a face detection result of an image, in which the transitional region is between the facial region and the non-facial region S120 — executing different processes for the data of the facial region, the data of the non-facial region and the data of the transitional region respectively (51) Int. Cl.
*G06K 9/40* (2006.01)
*G06T 7/11* (2017.01)

(58) Field of Classification Search
CPC . G06T 2207/10016; G06T 2207/20201; G06T 5/003; G06T 5/50; G06T 7/20; G06T 7/246; G06T 7/90; G06T 2207/10048; G06T 2207/20076; G06T 2207/20212; G06T 7/248

See application file for complete search history.

(56) References Cited

U.S. PATENT DOCUMENTS

| | | | |
|---|---|---|---|
| 8,983,152 B2 | 3/2015 | Lewis et al. | |
| 10,027,963 B2 * | 7/2018 | Su | H04N 19/117 |
| 2009/0180555 A1 * | 7/2009 | Sun | H04N 19/85 |
| | | | 375/240.29 |

* cited by examiner

| 128 | 128 | 128 |
|-----|-----|-----|
| 128 | 128 | 128 |
| 128 | 128 | 128 |

Y

+

| 0 | -10 | 15 |
|---|-----|----|
| 12 | 3 | -8 |
| 4 | -1 | -2 |

R

=

| 128 | 118 | 143 |
|-----|-----|-----|
| 140 | 131 | 120 |
| 132 | 127 | 126 |

$Y_{DITHER}$

Fig. 4

| 128 | 128 | 128 |
|-----|-----|-----|
| 128 | 128 | 128 |
| 128 | 128 | 128 |

Y

\+

| 0 | -5 | 7 |
|---|----|---|
| 6 | 1 | -4 |
| 2 | 0 | -1 |

R

=

| 128 | 123 | 135 |
|-----|-----|-----|
| 134 | 129 | 124 |
| 130 | 128 | 127 |

$Y_{DITHER}$

Fig. 5

IMAGE PROCESSING METHOD CAPABLE OF PROCESSING FACIAL DATA AND NON-FACIAL DATA DIFFERENTIALLY

BACKGROUND OF THE INVENTION

1. Field of the Invention

The present invention relates to an image processing method, especially to an image processing method capable of processing facial data and non-facial data differentially.

2. Description of Related Art

Conventional image processing may include a noise-reduction process, a sharpening and edge-enhancement process, and a brightness-adjustment process. The resulting effects, which are related to the parameters for processing the input image, of the above-mentioned processes usually depend on the data of the whole input image. However, when the input image includes a human face image or other types of faces, those processes may lead to a lack of fidelity of the processed human face image. More specifically, the effect of the noise-reduction process may be too strong or weak and thereby cause the processed human face image to lose detail (e.g., the disappearance of pores) or retain too much noise; the effect of the sharpening and edge-enhancement process may be too strong or weak and thereby cause the edges of the processed human face image to be abruptly modified (e.g., the strange eyebrow) or blurred; and the effect of the brightness-adjustment process may be too strong or weak and thereby cause the processed human face image to be overly bright or dark (e.g., the blurred contour of the processed human face image). Since the viewer is sensitive to the appearance of the human face in the image, when any of the above-mentioned processes distorts the human face in the image, the viewer may detect the distortion immediately and feel weird. As a result, a solution to the problem of human face image distortion caused by the conventional image processing method is desired.

SUMMARY OF THE INVENTION

An object of the present invention is to provide an image processing method capable of preventing the problem of the prior art.

The present invention discloses an image processing method capable of processing facial data and non-facial data differentially. The method is carried out by an image processing device, and an embodiment of the method includes the following steps: determining a facial region, a non-facial region and a transitional region according to a face detection result of an image, in which the transitional region is between the facial region and the non-facial region; and executing different processes for the data of the facial region, the data of the non-facial region and the data of the transitional region respectively. An embodiment of the above-mentioned different processes includes different noise-reduction processes, different sharpening and edge-enhancement processes, and different high-frequency-information-addition processes.

Another embodiment of the image processing method of the present invention includes the following steps: determining a facial region and a non-facial region according to a face detection result of an image; and executing at least one of multiple image processing steps. The multiple image processing steps include: a step of executing a first noise-reduction process for the data of the facial region and executing a second noise-reduction process for the data of the non-facial region, in which the first noise-reduction process and the second noise-reduction process are different; a step of executing a first sharpening and edge-enhancement process for the data of the facial region and executing a second sharpening and edge-enhancement process for the data of the non-facial region, in which the first sharpening and edge-enhancement process and the second sharpening and edge-enhancement process are different; a step of executing a first brightness-adjustment process for the data of the facial region and executing a second brightness-adjustment process for the data of the non-facial region, in which the first brightness-adjustment process and the second brightness-adjustment process are different; and a step of executing a first high-frequency-information-addition process for the data of the facial region and executing a second high-frequency-information-addition process for the data of the non-facial region, in which the first high-frequency-information-addition process and the second high-frequency-information-addition process are different.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes an image processing method capable of processing the facial data of an image and the non-facial data of the image differentially so that the facial data of the image can be processed in a better way and the distortion of the face in the image can be relieved. The image processing method is realized by a software and/or a firmware and can be executed by a known or self-developed image signal processor (ISP). In addition, the face detection result of which the present invention makes use can be generated by an ISP having a function of human face detection or by an external device; for instance, the ISP is an integrated circuit and the external device, e.g., a device executing computer operating system software and computer application software, is not included in the integrated circuit.

Figure 1:
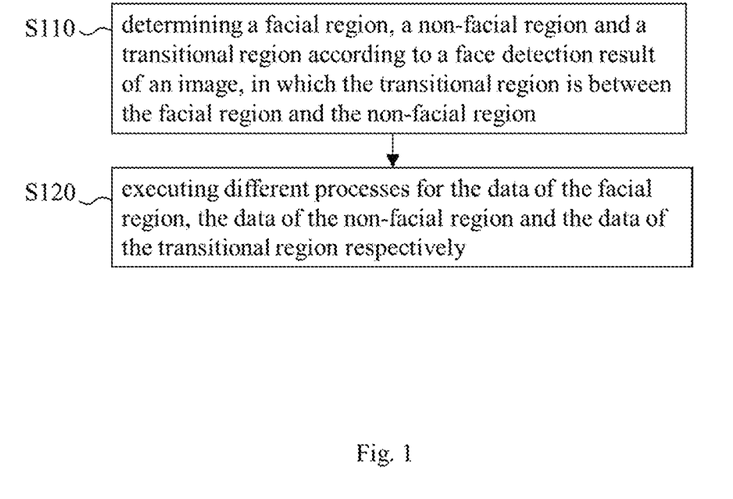
FIG. 1 shows an embodiment of the image processing method of the present invention.
Figure 2:
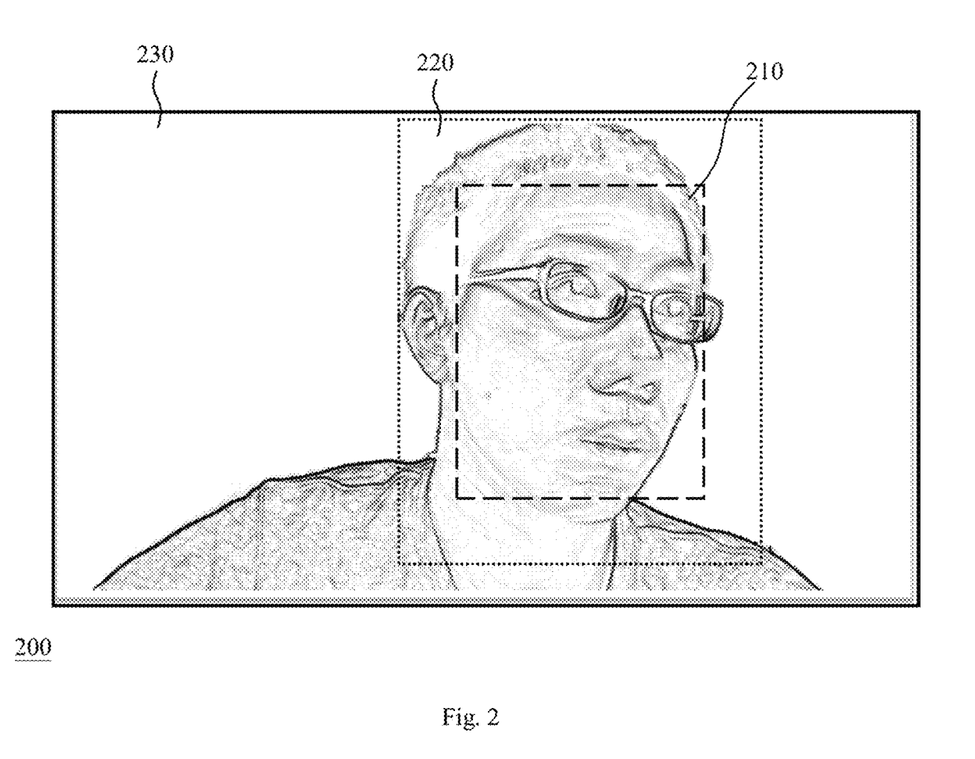
FIG. 2 shows the facial region, the non-facial region, and the transitional region determined by step S110 of FIG. 1.

FIG. 1 shows an embodiment of the image processing method of the present invention. This embodiment includes the following steps:

Step S110: determining a facial region, a non-facial region and a transitional region according to a face detection result of an image, in which the transitional region is between the facial region and the non-facial region. For instance, as shown in FIG. 2, step S110 can determine a facial region 210 (i.e., the region surrounded by the dashed line in FIG. 2), a transitional region 220 (i.e., the region between the dashed line and the dotted line in FIG. 2), and a non-facial region 230 (e.g., the region outside the dotted line) according to the face detection result of the $N^{th}$ frame of the image, in which the N is a positive integer.

Step S120: executing different processes for the data of the facial region, the data of the non-facial region and the data of the transitional region respectively. For instance, step S120 executes a first image process for the data of the facial region, a second image process for the data of the non-facial region, and a third image process for the data of the transitional region, in which the first, second and third image processes are the same kinds of image processes but have different effects, and each of the first, second and third image processes can keep using the same set(s) of image processing parameters or select at least one set of image processing parameters among multiple sets of image processing parameters in accordance with the information of the image (e.g., the scene detection result of the image).

Figure 3:
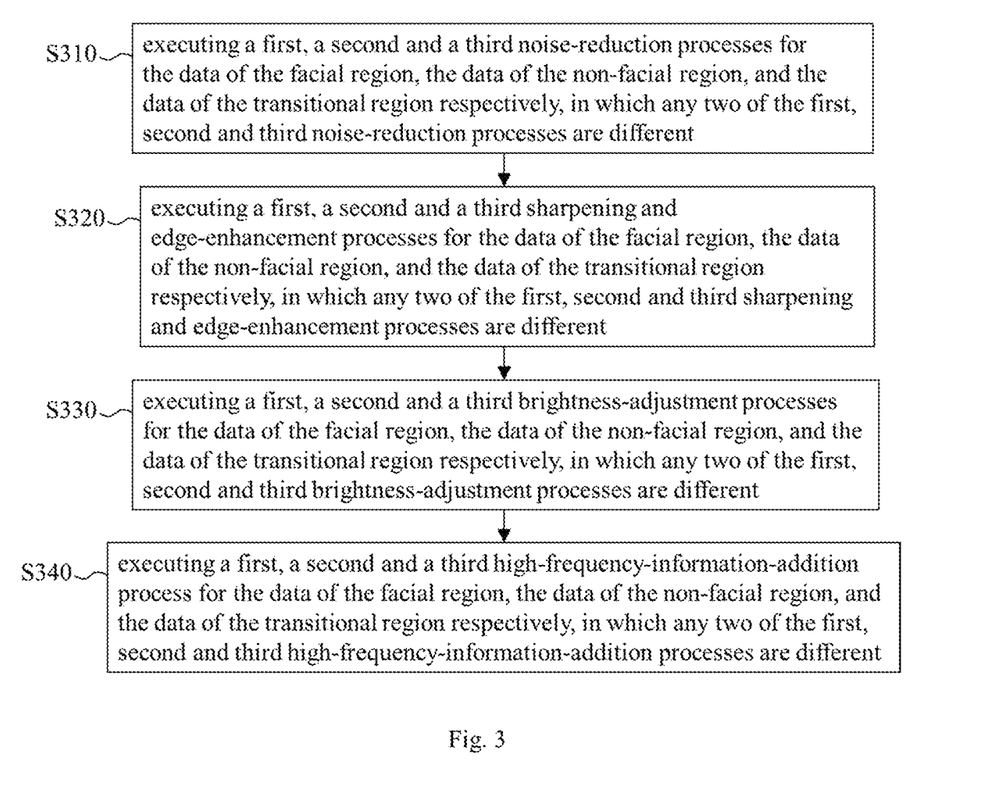
FIG. 3 shows an embodiment of step S120 of FIG. 1.

FIG. 3 shows an embodiment of step S120 of FIG. 1. This embodiment includes steps S310~S340; however, in an alternative embodiment of the present invention, step S120 merely includes at least one of steps S310~S340. The steps of FIG. 3 are described in the following paragraphs respectively.

As shown in FIG. 3, step S310 includes: executing a first noise-reduction process for the data of the facial region, executing a second noise-reduction process for the data of the non-facial region, and executing a third noise-reduction process for the data of the transitional region, in which any two of the first noise-reduction process, the second noise-reduction process, and the third noise-reduction process are different. In an exemplary implementation, the frames of the image are inputted successively, and if step S110 uses the face detection result of the $N^{th}$ frame of the image, the data processed by each of steps S310~S340 should be the data of the $(N+k)^{th}$ frame of the image, in which the k is a positive integer (e.g., 1). In an exemplary implementation, the effect of the first noise-reduction process is weaker than the effect of the second noise-reduction process so as to prevent the facial region from losing too much image detail; in other words, when the effect of a noise-reduction process gets stronger, the noise of the image region processed by the noise-reduction process gets less and the texture detail of the image gets less and looks blurred. In an exemplary implementation, the effect of the third noise-reduction process is between the effect of the first noise-reduction process and the effect of the second noise-reduction process. In an exemplary implementation, each of the noise-reduction processes in step S310 is a low-pass filtering process. In an exemplary implementation, the above-mentioned low-pass filtering process is a mean filtering process; when the sample range (e.g., a range of 5 pixels by 5 pixels, in which the central pixel is a target pixel and the average of the 25 pixels in the range replaces the original value of the target pixel) is larger, the effect of the noise-reduction process is stronger; when the sample range (e.g., a range of 3 pixels by 3 pixels, in which the central pixel is a target pixel and the average of the 9 pixels in the range replaces the original value of the target pixel) is smaller, the effect of the noise-reduction process is weaker; accordingly, the effects of the first, second and third noise-reduction processes can be determined according to the setting of their sample ranges.

As shown in FIG. 3, step S320 includes: executing a first sharpening and edge-enhancement process for the data of the facial region, executing a second sharpening and edge-enhancement process for the data of the non-facial region, and executing a third sharpening and edge-enhancement process for the data of the transitional region, in which any two of the first sharpening and edge-enhancement process, the second sharpening and edge-enhancement process, and the third sharpening and edge-enhancement process are different. In an exemplary implementation, the effect of the first sharpening and edge-enhancement process is weaker than the effect of the second sharpening and edge-enhancement process so as to prevent the edge of the facial region from being abrupt while the sharpness and/or the contrast of the non-facial region can be enhanced; in other words, when the effect of a sharpening and edge-enhancement process gets stronger, the texture of an image region processed by the sharpening and edge-enhancement process gets clear. In an exemplary implementation, the effect of the third sharpening and edge-enhancement process is between the effect of the first sharpening and edge-enhancement process and the effect of the second sharpening and edge-enhancement process. In an exemplary implementation, each sharpening and edge-enhancement process in step S320 is an edge-gradient enhancement process which is used for decreasing the brightness of the dark pixels of an image border and/or increasing the brightness of the bright pixels of the image border.

As shown in FIG. 3, step S330 includes: executing a first brightness-adjustment process for the data of the facial region, executing a second brightness-adjustment process for the data of the non-facial region, and executing a third brightness-adjustment process for the data of the transitional region, in which any two of the first brightness-adjustment process, the second brightness-adjustment process, and the third brightness-adjustment process are different. In an exemplary implementation, the effect of the first brightness-adjustment process is stronger than the effect of the second brightness-adjustment process so as to prevent the facial region from being too dark in a back-lighted scene; in other words, when the effect of a brightness-adjustment process gets stronger, an image region processed by the brightness-adjustment process gets brighter. In an exemplary implementation, the effect of the first brightness-adjustment process is weaker than the second brightness-adjustment process so as to prevent the facial region from being overexposed when keeping background detail. In an exemplary implementation, the effect of the third brightness-adjustment process is between the effect of the first brightness-adjustment process and the effect of the second brightness-adjustment process. In an exemplary implementation, each brightness-adjustment process in step S330 is a gamma correction process, in which the relation between the brightness output of the facial region and the brightness input of the facial region is $I_{OUT}=(I_{IN})^{r_1}$, the relation between the brightness output of the non-facial region and the brightness input of the non-facial region is $I_{OUT}=(I_{IN})^{r_2}$, and $r_1$ is smaller than $r_2$.

Figure 4:
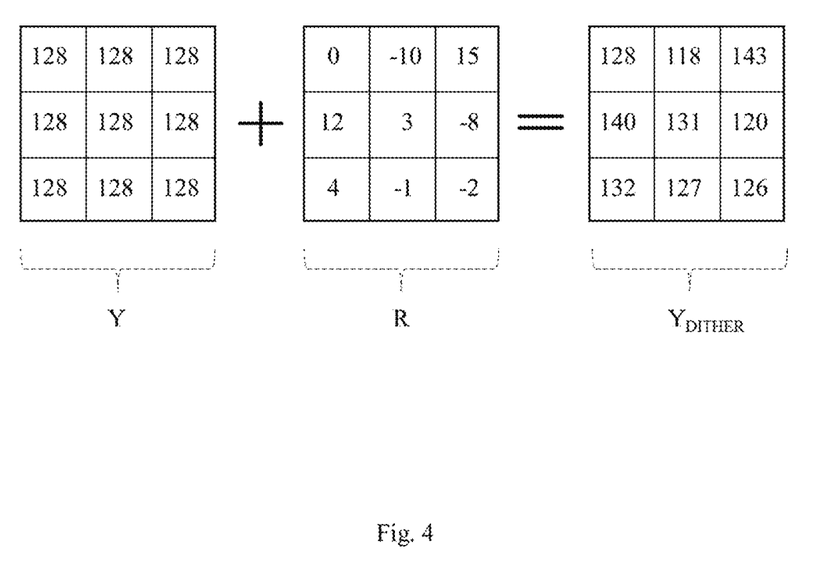
FIG. 4 shows an embodiment of step S340 of FIG. 3 for processing the data of the facial region.
Figure 5:
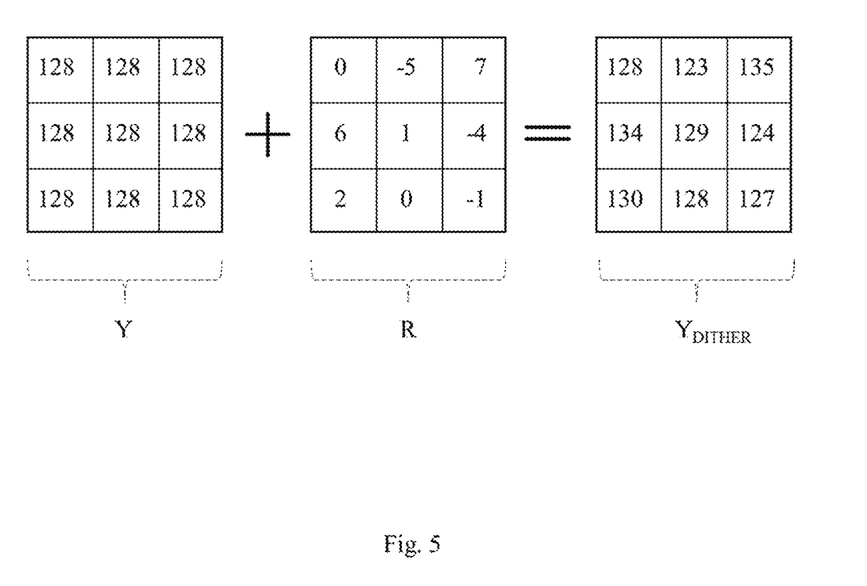
FIG. 5 shows an embodiment of step S340 of FIG. 3 for processing the data of the non-facial region.

As shown in FIG. 3, step S340 includes: executing a first high-frequency-information-addition process for the data of the facial region, executing a second high-frequency-information-addition process for the data of the non-facial region, and executing a third high-frequency-information-addition process for the data of the transitional region, in which any two of the first high-frequency-information-addition process, the second high-frequency-information-addition process, and the third high-frequency-information-addition process are different. In an exemplary implementation, the effect of the first high-frequency-information-addition process is stronger than the effect of the second high-frequency-information-addition process so as to increase the variation of the facial region and have the facial region look natural; in other words, when the effect of a high-frequency-information-addition process gets stronger, an image region processed by the high-frequency-information-addition process includes stronger high frequency information and looks rougher. In an exemplary implementation, the effect of the third high-frequency-information-addition process is between the effect of the first high-frequency-information-addition process and the effect of the second high-frequency-information-addition process. In an exemplary implementation, each high-frequency-information-addition process in step S340 is a dithering process; in detail, if original pixel values are Y, dithered pixel values $Y_{DITHER}$ can be obtained and outputted by adding the original pixel values Y and random values R (i.e., high frequency information) up, in which the random values R can be generated by any kind of known random models (e.g., Cyclic Redundancy Check (CRC) model) or self-developed models. When the pixels of the original pixel values Y pertain to the facial region, each of the random values R is within a wider range (i.e., $R_{min1} \leq R \leq R_{max1}$); an instance of the aforementioned dithering process and the result thereof is shown in FIG. 4. When the pixels of the original pixel values Y pertain to the non-facial region, each of the random values R is within a narrower range (i.e., $R_{min2} \leq R \leq R_{max2}$, in which $R_{min1} \leq R_{min2}$ and $R_{max2} \leq R_{max1}$); an instance of the aforementioned dithering process and the result thereof is shown in FIG. 5.

In an embodiment of the present invention, in order to have the processed image of the transitional region look more natural, at least one of the aforementioned third noise-reduction process, third brightness-adjustment process, and third high-frequency-information-addition process is a gradual process (e.g., a linearization process). The gradual process has an increasing or decreasing effect of image processing along the direction from the facial region to the non-facial region; in other words, when the position of a pixel processed by the gradual process gets closer to the facial region, the image processing effect of the gradual process on the pixel gets more similar to the image processing effect on the facial region, and when the position of a pixel processed by the gradual process gets closer to the non-facial region, the image processing effect of the gradual process on the pixel gets more similar to the image processing effect on the non-facial region. In another embodiment of the present invention, at least one of the third noise-reduction process, the third brightness-adjustment process, and the third high-frequency-information-addition process has a constant effect of image processing, which means that its/their image processing effect(s) does/do not vary with the distance between a processed pixel and the facial region. In yet another embodiment, at least one of the aforementioned first noise-reduction process, first brightness-adjustment process, and first high-frequency-information-addition process is a gradual process (e.g., a process using a progressively increasing function characterized by decreasing increment (e.g., $X/(X+1)$)), and the gradual process has an increasing or decreasing effect along the direction from the center of the facial region to the non-facial region; in this embodiment, the transitional region is optional rather than necessary.

It should be noted that if an implementation derived from one or more of the aforementioned embodiments is practicable, a person of ordinary skill in the art can selectively make use of some or all of the features in one of the embodiments or selectively make use of the combination of some or all features in several of the embodiments to have the implementation come true, so as to increase the flexibility of executing the present invention.

To sum up, the image processing method of the present invention can processing facial data and non-facial data differentially so as to improve the appearance of a human face in the facial region of an image without affecting the image processing effect of the non-facial region of the image; as a result, the problem of human face distortion can be relieved.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method comprising:
   determining a facial region, a non-facial region, and a transitional region according to a face detection result of an image, the transitional region being between the facial region and the non-facial region; and
   executing different processes for data of the facial region, data of the non-facial region, and data of the transitional region respectively,
   wherein the step of executing different processes includes:
      executing a first dithering process for the data of the facial region;
      executing a second dithering process for the data of the non-facial region; and
      executing a third dithering process for the data of the transitional region, in which the first dithering process adopts a first random value range, the second dithering process adopts a second random value range, the third dithering process adopts a third random value range, the first random value range is wider than the third random value range, and the third random value range is wider than the second random value range.

2. The method of claim 1, wherein the step of executing different processes includes at least one of following steps:
   a step of executing a first noise-reduction process for the data of the facial region, executing a second noise-reduction process for the data of the non-facial region, and executing a third noise-reduction process for the data of the transitional region, in which any two of the first noise-reduction process, the second noise-reduction process, and the third noise-reduction process are different;
   a step of executing a first sharpening and edge-enhancement process for the data of the facial region, executing a second sharpening and edge-enhancement process for the data of the non-facial region, and executing a third sharpening and edge-enhancement process for the data of the transitional region, in which any two of the first sharpening and edge-enhancement process, the second sharpening and edge-enhancement process, and the third sharpening and edge-enhancement process are different;
   a step of executing a first brightness-adjustment process for the data of the facial region, executing a second brightness-adjustment process for the data of the non-facial region, and executing a third brightness-adjustment process for the data of the transitional region, in which any two of the first brightness-adjustment process, the second brightness-adjustment process, and the third brightness-adjustment process are different; and a step of executing a first dithering process for the data of the facial region, executing a second dithering process for the data of the non-facial region, and executing a third dithering process for the data of the transitional region, in which any two of the first dithering process, the second dithering process, and the third dithering process are different.

3. The method of claim 2, wherein an effect of the third noise-reduction process is between an effect of the first noise-reduction process and an effect of the second noise-reduction process, an effect of the third sharpening and edge-enhancement process is between an effect of the first sharpening and edge-enhancement process and an effect of the second sharpening and edge-enhancement process, an effect of the third brightness-adjustment process is between an effect of the first brightness-adjustment process and an effect of the second brightness-adjustment process, and an effect of the third dithering process is between an effect of the first dithering process and an effect of the second dithering process.

4. The method of claim 3, wherein the effect of the first noise-reduction process is weaker than the effect of the second noise-reduction process, the effect of the first sharpening and edge-enhancement process is weaker than the effect of the second sharpening and edge-enhancement process, the effect of the first brightness-adjustment process is weaker or stronger than the effect of the second brightness-adjustment process, and the effect of the first dithering process is stronger than the effect of the second dithering process.

5. The method of claim 2, wherein an effect of the first noise-reduction process is weaker than an effect of the second noise-reduction process, an effect of the first sharpening and edge-enhancement process is weaker than an effect of the second sharpening and edge-enhancement process, an effect of the first brightness-adjustment process is weaker or stronger than an effect of the second brightness-adjustment process, and an effect of the first dithering process is stronger than an effect of the second dithering process.

6. The method of claim 2, wherein each of the first noise-reduction process, the second noise-reduction process, and the third noise-reduction process is a low-pass filtering process.

7. The method of claim 2, wherein each of the first noise-reduction process, the second noise-reduction process, and the third noise-reduction process is a mean filtering process.

8. The method of claim 2, wherein each of the first sharpening and edge-enhancement process, the second sharpening and edge-enhancement process, and the third sharpening and edge-enhancement process is an edge-gradient enhancement process.

9. The method of claim 2, wherein each of the first brightness-adjustment process, the second brightness-adjustment process, and the third brightness-adjustment process is a gamma correction process.

10. The method of claim 2, wherein at least one of the third noise-reduction process, the third sharpening and edge-enhancement process, and the third dithering process is a gradual process which has an increasing or decreasing effect of image processing along a direction from the facial region to the non-facial region.

11. The method of claim 10, wherein the gradual process is a linearization process.

12. The method of claim 2, wherein at least one of the third noise-reduction process, the third sharpening and edge-enhancement process, and the third dithering process has a constant effect of image processing.

13. The method of claim 1, further comprising:
receiving data of the image for execution of face detection and thereby generating the face detection result of the image; or
receiving the face detection result of the image from an external device.

14. A method comprising:
determining a facial region and a non-facial region according to a face detection result of an image; and
executing at least one of following steps:
    executing a first noise-reduction process for data of the facial region and executing a second noise-reduction process for data of the non-facial region, in which the first noise-reduction process and the second noise-reduction process are different;
    executing a first sharpening and edge-enhancement process for the data of the facial region and executing a second sharpening and edge-enhancement process for the data of the non-facial region, in which the first sharpening and edge-enhancement process and the second sharpening and edge-enhancement process are different;
    executing a first brightness-adjustment process for the data of the facial region and executing a second brightness-adjustment process for the data of the non-facial region, in which the first brightness-adjustment process and the second brightness-adjustment process are different; and
    executing a first dithering process for the data of the facial region and executing a second dithering process for the data of the non-facial region, in which the first dithering process and the second dithering process are different,
wherein the first dithering process adopts a first random value range, the second dithering process adopts a second random value range, and the first random value range is wider than the second random value range.

15. The method of claim 14, wherein an effect of the first noise-reduction process is weaker than an effect of the second noise-reduction process, an effect of the first sharpening and edge-enhancement process is weaker than an effect of the second sharpening and edge-enhancement process, an effect of the first brightness-adjustment process is stronger or weaker than an effect of the second brightness-adjustment process, and an effect of the first dithering process is stronger than an effect of the second dithering process.

16. The method of claim 14, wherein each of the first noise-reduction process and the second noise-reduction process is a low-pass filtering process.

17. The method of claim 14, wherein each of the first sharpening and edge-enhancement process and the second sharpening and edge-enhancement process is an edge-gradient enhancement process.

18. The method of claim 14, wherein each of the first brightness-adjustment process and the second brightness-adjustment process is a gamma correction process.

\* \* \* \* \*